United States Patent Office 3,360,569
Patented Dec. 26, 1967

3,360,569
11-CARBORANYL-ALKENES AND THE
PREPARATION THEREOF
Daniel Grafstein, Morristown, Jack Bobinski, Rockaway, and Marvin M. Fein, Westfield, N.J., assignors to Thiokol Chemical Corporation, Bristol, Pa.
No Drawing. Filed June 27, 1963, Ser. No. 290,904
14 Claims. (Cl. 260—606.5)

The present invention relates to compounds containing boron and to methods for making the same.

In recent years, there has been considerable interest in boron-containing compounds because the high heat of combustion of these compounds adapts them for use as rocket fuels. According to the present invention, boron compounds have been prepared, which compounds are useful as intermediates in boron-containing polymers useful as propellant binders. Moreover, the compounds of the present invention are themselves useful as high-energy fuels and as fuel additives. The solid products of this invention, either per se or after formation into a polymer, can be used as solid propellants for rocket power plants and other jet-propelled devices when mixed with suitable oxidizers such as ammonium, potassium, or sodium perchlorates, ammonium nitrate, etc. Such propellant mixtures are compounded by a number of techniques known to the art. For example, the mixtures may comprise from 5 to 35 parts by weight of boron-containing materials and from 65 to 95 parts by weight of solid oxidizing agents mixed therewith. In some cases, the propellant may also be made by combining the boron compounds and oxidizers with a curable polymer, for example, of the polyethylene, polyurethane, polyester, or polyether types.

Other products of the invention may be used as additives in high energy liquid fuels by mixing the products with combustible liquids such as compatible hydrocarbon fuels.

The boron-containing compounds of the invention may all be considered derivatives of carborane, which is a compound of carbon, hydrogen, and boron, having the empirical formula $C_2H_{12}B_{10}$. Carborane is a solid material melting at 287°–288° C. It is characterized by a surprisingly stable nuclear structure and two labile hydrogen atoms, one connected to each carbon atom. It may be conveniently represented by using the formula H$\theta$H. While there is some difference of opinion as to the molecular structure of carborane, its stability is usually attributed to a basket-shaped molecular configuration in which the ten boron atoms and two carbon atoms may be arranged at the apices of an icosahedron.

The method of the present invention comprises reacting a Grignard reagent of a haloalkyl carborane, such as that of 11-bromomethyl carborane, with a halogenated and unsaturated aliphatic hydrocarbon to form an unsaturated boron-containing material which may be designated as an 11-carboranyl-alkene. Equations typifying these reactions are as follows:

(1) $$H\theta R_1 X + Mg \xrightarrow{Et_2O} H\theta R_1 MgX$$

(2) $$H\theta R_1 MgX + R_4 CH{=}CHR_2 X \xrightarrow{Et_2O} H\theta R_1 R_2 CH{=}CHR_4 + MgX_2$$

where $R_1$ represents an alkylene group, $R_2$ represents an alkylene group preferably containing up to two carbon atoms, $R_4$ designates a hydrogen atom or an alkyl group, X represents a halogen atom such as bromine, iodine, or chlorine, and $\theta$ represents the group $C_2H_{10}B_{10}$ which may be represented as

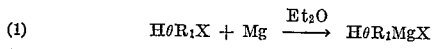

with the delocalized pi-bonding between the carbon-chain and decaborane group as shown. The carboranyl product of Equation 2 may also be written $H\theta R_5 CH{=}CH_4$ where $R_5$ is an alkylene group corresponding to the combination symbol $R_1 R_2$.

When this reaction is conducted in tetrahydrofuran, the following rearrangement takes place:

(3) $$H\theta R_1 X + Mg \xrightarrow{THF} HR_1 \theta MgX$$

(4) $$XMg\theta R_1 H + R_4 CH{=}CHR_2 X \longrightarrow HR_1 \theta R_2 CH{=}CHR_4 + MgX_2$$

The carboranyl product of Equation 4 may also be written $R_6 \theta R_2 CH{=}CHR_4$ where $R_6$ is an alkyl group equivalent to $HR_1$.

In the products of this rearrangement occurring in tetrahydrofuran, X is a halogen atom.

The unsaturated materials of the formulae $$H\theta R_5 CH{=}CHR_4 \text{ and } R_6 \theta R_2 CH{=}CHR_4$$

may be further reacted with compounds such as trifluoroperacetic acid to form epoxides and reactive addition products. These latter reactions are suitably carried out in an inert solvent medium, for example in methylene dichloride.

(5) 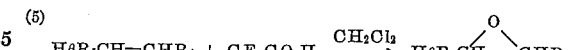

(6) 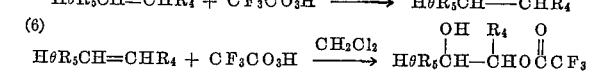

In reaction 5, the pH is maintained above 7 by the presence of sodium carbonate or other such materials known to the art. This pH level is critical for the formation of an epoxy compound. When the reaction is not carried out in the presence of an alkaline compound, such as $Na_2CO_3$, the reaction results in the formation of, for example, the corresponding trifluoroacetic acid product as seen in reaction (6). The reaction between a haloalkyl carborane and magnesium [c.f. reaction (1)] is suitably carried out at room temperature, but higher or lower temperatures may be used when convenient. Likewise, the reaction between a halogenated and unsaturated aliphatic hydrocarbon and the Grignard reagent may be carried out suitably at room temperature. However, after adding the said hydrocarbon to the reaction mix at room temperature or below, it is usually convenient to shorten the time of this reaction by processing the reactants at a somewhat elevated temperature such as at the boiling temperature of the solvent medium. Of course, as is evident to one skilled in the art, the boiling temperature of the solvent medium employed may be below room temperature in some instances. In such a case, the entire process may be carried out at the lower temperature or, if desired, the reaction vessel may be pressurized to allow processing at a higher temperature while maintaining the low-boiling solvent in a liquid state.

The reaction between the unsaturated hydrocarbon-decaborane compound and a material such as perfluoroperacetic acid may also be carried out suitably over a range of temperatures, as has been described in the preceding paragraph. However, it is preferable that the step wherein the perfluoroperacetic acid is added to the said hydrocarbon to be carried out at room temperature or even somewhat below room temperature. In addition to perfluoroperacetic acid, other peroxide-type acids such as peracetic acid and peroxythichloroacetic acid may be used in the practice of the present invention.

It will also be understood by those skilled in the art that, in all cases, the reactants are suitably maintained in contact for a time permitting substantially complete reaction. The reaction time is not critical, and will vary with the reaction temperature, concentration, etc., as is usual in chemical reactions.

The unsaturated compounds, HθR₅CH=CHR₄ suitable for reaction according to the method of the present invention, may be chosen from compounds wherein R₅ is an alkylene group, either branched or straight-chained but preferably an alkylene group with from 2 to 12 carbons and most preferably an alkylene group having 2 to 8 carbon atoms. R₄ is also an alkyl group and preferably contains from 1 to 3 carbon atoms. Groups with straight chains are preferred over those with excessively branched chains because of the greater probability of steric hindrance of the reaction and consequent low or negligible yield of product when the latter materials are used.

Similarly, the haloalkyl carborane such as HθR₁Br may be chosen from a large number of materials provided that the alkylene group is not branched to such an extent as materially to affect the process. Compounds wherein R₁ contains from 1 to 9 carbon atoms are convenient; most preferably, the alkylene group is chosen from lower alkylene groups such as those having 1 to 4 carbons. These haloalkyl carborane compounds are conveniently prepared by reacting an acetylenic material like a propargyl halide with bis(acetonitrile)decaborane in refluxing benzene for 24 hours. This method is set forth in United States application Serial Number 64,216 filed Oct. 21, 1960, now U.S. Patent 3,287,416.

The solvent used as the reaction medium is usually anhydrous diethyl ether because it is neutral and because of its ability to contribute electrons to the forming of bonds with the magnesium atom, thus allowing the magnesium atom to "complete its octet" and form a Grignard reagent. The cyclic ether tetrahydrofuran is also used in the process of the present invention.

In order to point out more fully the nature of the present invention, the following specific examples are given as illustrative embodiments of the present process and the products produced thereby.

*Example 1*

A Grignard reagent was prepared by placing 2.5 gms. of fresh magnesium turnings and 23.5 gms. of bromomethyl carborane into 250 ml. of anhydrous ethyl ether. The materials reacted rapidly with the evolutions of some heat.

The reaction mix was cooled to 19 C. and 11.8 grams of allyl bromide, which had been dissolved in 80 ml. of ethyl ether, were added dropwise to the reaction mix while the temperature was maintained at about 20° C. When the addition of the alkyl bromide was completed, the mixture was heated to the boiling point and kept at reflux for seven hours. On cooling, a saturated aqueous solution of ammonium chloride was used to hydrolyze the mixture. The ether layer was removed in a separatory funnel, and the product was separated from the ether by distillation.

The boiling point of the product at an absolute pressure of 0.2 mm. of mercury was 99°–101° C. The melting point was 33°–34° C. The yield obtained was 60% of theoretical. The infra-red spectrum of the product confirmed the product 4-(11-carboranyl)butene-1.

Calculated for C₆H₁₀B₁₀: C, 36.32%; H, 9.14%; B, 54.54%. Found: C, 34.71%, H, 9.43%, B, 54.31%.

*Example 2*

A reaction was conducted as described in Example 1. The sole difference was that tetrahydrofuran was substituted for ethyl ether as the solvent medium. The product of the reaction was shown to be, on the basis of an infra-red analysis, 11-allyl-12-methylcarborane.

The boiling point of this compound was 100° C. at 0.1 mm. of mercury, absolute pressure. The melting point was 17°–18° C.; the yield obtained was 54% of theoretical yield.

*Example 3*

A suspension of one ml. of 90% hydrogen peroxide in 20 ml. of methylene dichloride was cooled in an ice bath. A total of 6.35 ml. of trifluoracetic acid was added to this suspension over a 15-minute period. This quantity represents a small excess over the stoichiometric amount of trifluoracetic acid taking part in the reaction.

The reaction product was stirred, cooled for 15 additional minutes and then added very slowly to a mixture containing 12.0 grams of anhydrous sodium carbonate, about 30 ml. of methylene dichloride, and 5.0 grams of butenyl carborane. The latter material had been previously prepared according to the method of Example 1.

This addition was carried out over a period of two hours, with stirring, and at room temperature. On completion of the addition, the mixture was heated to reflux for 30 minutes, then cooled and filtered.

The methylene dichloride solution was concentrated and the residue distilled. The product was determined to be 4-(11-carboranyl)butene-1 oxide, i.e.,

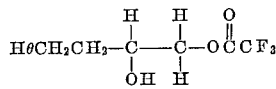

The boiling point was 132°–135° C. at 0.4 mm. Hg absolute pressure. The melting point was 60° C.

An infra-red analysis confirmed the identity of the product:

Calculated for C₆H₁₈B₁₀O: C, 33.61%; H, 8.46%; B, 50.47%. Found: C, 33.59%; H, 8.61%; B, 49.30%.

The above procedure resulted in a product yield which was 63% of theroretical.

*Example 4*

The procedure set forth under Example 3 was followed in every detail except that sodium carbonate was absent in this reaction. The product, 4-(11-carboranyl)-1, 2-butylene glycol monotrifluoroacetate, i.e.,

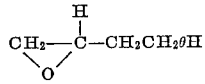

was obtained in 30% yield. The boiling point of that material was 98°–100° C. at an absolute pressure of 0.2 mm. Hg.

An infra-red analysis confirmed the synthesis of the above-identified product: percent fluorine calculated, 17.25; percent fluorine found, 17.19.

It is, of course, to be understood that the foregoing examples are intended to be illustrative and that numerous changes can be made in the ingredients, proportions, and conditions set forth therein without departing from the spirit of the invention as defined in the appended claims.

We claim:
1. A compound of the formula

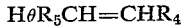

wherein R₄ is chosen from the group consisting of a hydrogen atom and an alkyl group, R₅ is an alkylene group and θ is C₂H₁₀B₁₀.

2. A compound of the formula

wherein R₅ is an alkylene group, and θ is C₂H₁₀B₁₀.

3. A compound of the formula

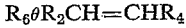

wherein R₂ is an alkylene group, R₄ is chosen from the group consisting of a hydrogen atom and an alkyl group, R₆ is an alkyl group, and θ is C₂H₁₀B₁₀.

4. A compound of the formula

wherein R₂ is an alkylene group, R₆ is an alkyl group, and θ is C₂H₁₀B₁₀.

5. A compound of the formula

wherein $R_4$ is chosen from the group consisting of a hydrogen atom and a lower alkyl group having 1 to 3 carbon atoms, $R_5$ is an alkyl group of 2 to 8 carbon atoms, and $\theta$ is $C_2H_{10}B_{10}$.

6. A compound of the formula $$H\theta R_5 CH=CH_2$$

wherein $R_5$ is an alkylene group having 2 to 8 carbon atoms, and $\theta$ is $C_2H_{10}B_{10}$.

7. A compound of the formula $$R_6\theta R_2 CH=CHR_4$$

wherein $R_2$ is an alkylene group having 1 to 4 carbon atoms, $R_4$ is chosen from the group consisting of a hydrogen atom and a lower alkyl group having 1 to 3 carbon atoms, $R_6$ is an alkyl group of 1 to 4 carbon atoms, and $\theta$ is $C_2H_{10}B_{10}$.

8. A compound of the formula $$R_6\theta R_2 CH=CH_2$$

wherein $R_2$ is an alkylene group having 1 to 4 carbon atoms, $R_6$ is an alkyl group of 1 to 4 carbon atoms, and $\theta$ is $C_2H_{10}B_{10}$.

9. A compound of the formula $$H\theta CH_2 CH_2 CH=CH_2$$

wherein $\theta$ is $C_2H_{10}B_{10}$.

10. A compound of the formula $$CH_3\theta CH_2 CH=CH_2$$

wherein $\theta$ is $C_2H_{10}B_{10}$.

11. A process comprising reacting a compound of the formula $H\theta R_2 MgX$ with a compound of the formula $H_2C=CH-R_2X$ in an inert solvent and hydrolyzing the reaction mixture to obtain a compound of the formula $$H\theta R_5 CH=CH_2$$

wherein $R_1$, $R_2$ and $R_5$ are alkylene groups, and $\theta$ is $C_2H_{10}B_{10}$.

12. A process comprising reacting a compound of the formula $R_6\theta MgX$ with a compound of the formula $H_2C=CH-R_2X$ in an inert solvent, hydrolyzing the reaction mixture to obtain a compound of the formula $$R_6\theta R_2 CH=CH_2$$

wherein $R_2$ is an alkylene group, $R_5$ is an alkyl group, and $\theta$ is $C_2H_{10}B_{10}$.

13. A process comprising reacting 11-bromomethyl carborane with magnesium in ethyl ether, reacting the resulting Grignard reagent with allyl bromide of the formula $H_2C=CH-CH_2Br$, and hydrolyzing the reaction mixture to obtain a compound of the formula $$H\theta CH_2 CH_2 CH=CH_2$$

wherein $\theta$ is $C_2H_{10}B_{10}$.

14. A process comprising reacting an 11-bromomethyl carborane with magnesium in tetrahydrofuran, reacting the resulting Grignard reagent with allyl bromide of the formula $H_2C=CH-CH_2Br$ in the tetrahydrofuran medium, and hydrolyzing the mixture to obtain a compound of the formula $$H_3C\theta CH_2 CH=CH_2$$

wherein $\theta$ is $C_2H_{10}B_{10}$.

References Cited

UNITED STATES PATENTS 3,121,119   2/1964   Heying _____ 260—6d.5

TOBIAS E. LEVOW, *Primary Examiner.*

REUBEN EPSTEIN, HELEN M. McCARTHY
*Examiners.*

W. F. W. BELLAMY, L. A. SEBASTIAN,
*Assistant Examiners.*

UNITED STATES PATENT OFFICE
CERTIFICATE OF CORRECTION

Patent No. 3,360,569            December 26, 1967

Daniel Grafstein et al.

It is hereby certified that error appears in the above numbered patent requiring correction and that the said Letters Patent should read as corrected below.

Column 4, line 75, for "$H\theta R_5CH=R_4$" read -- $H\theta R_5CH=CHR_4$ --.

Signed and sealed this 25th day of February 1969.

(SEAL)
Attest:

Edward M. Fletcher, Jr.
Attesting Officer

EDWARD J. BRENNER
Commissioner of Patents